(12) United States Patent
Huang et al.

(10) Patent No.: US 12,406,402 B2
(45) Date of Patent: Sep. 2, 2025

(54) ATLAS SAMPLING BASED MESH COMPRESSION WITH CHARTS OF GENERAL TOPOLOGY

(71) Applicant: TENCENT AMERICA LLC, Palo Alto, CA (US)

(72) Inventors: Chao Huang, Palo Alto, CA (US); Xiaozhong Xu, Palo Alto, CA (US); Xiang Zhang, Palo Alto, CA (US); Jun Tian, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 197 days.

(21) Appl. No.: 18/121,334

(22) Filed: Mar. 14, 2023

(65) Prior Publication Data
US 2023/0316585 A1 Oct. 5, 2023

Related U.S. Application Data

(60) Provisional application No. 63/326,182, filed on Mar. 31, 2022.

(51) Int. Cl.
G06T 9/00 (2006.01)
(52) U.S. Cl.
CPC .................................. *G06T 9/001* (2013.01)
(58) Field of Classification Search
None
See application file for complete search history.

(56) References Cited

U.S. PATENT DOCUMENTS

| | | | |
|---|---|---|---|
| 6,577,310 B1 | 6/2003 | Kim et al. | |
| 10,242,484 B1* | 3/2019 | Cernigliaro | G06T 9/008 |
| 2006/0284880 A1* | 12/2006 | Zhou | G06T 15/04 |
| | | | 345/582 |
| 2008/0284783 A1* | 11/2008 | Charbonnel | G06T 13/60 |
| | | | 345/473 |
| 2009/0109219 A1* | 4/2009 | DeCoro | G06T 17/205 |
| | | | 345/423 |
| 2018/0253886 A1* | 9/2018 | Hu | G06T 11/001 |
| 2018/0330480 A1* | 11/2018 | Liu | G06T 15/04 |
| 2019/0026942 A1* | 1/2019 | Zhang | G06T 15/205 |
| 2019/0303530 A1 | 10/2019 | Urick et al. | |
| 2019/0378332 A1* | 12/2019 | Sun | G06T 17/20 |

(Continued)

OTHER PUBLICATIONS

Tencent Technology, ISRWO, PCT/US2023/015304, Jun. 14, 2023, 11 pgs.

(Continued)

*Primary Examiner* — Jason A Pringle-Parker
(74) *Attorney, Agent, or Firm* — Morgan, Lewis & Bockius LLP

(57) ABSTRACT

Method, apparatus, and system for atlas sampling-based dynamic mesh compression are provided. The process may include receiving a mesh frame with polygons representing a surface of an object; determining that the mesh frame is associated with an irregular UV chart in response to one or more singularity components in the mesh frame; performing boundary detection to the UV chart to identify one or more boundary loops in the UV chart; and compressing information of the identified one or more boundary loops into a bitstream.

20 Claims, 10 Drawing Sheets

(56) References Cited

U.S. PATENT DOCUMENTS

2021/0019931 A1* 1/2021 De Goes ............... G06T 19/20
2021/0319581 A1 10/2021 Hur et al.

OTHER PUBLICATIONS

Jonathan Richard Shewchuk, "Delaunay Refinement Algorithms for Triangular Mesh Generation", Department of Electrical Engineering and Computer Science University of California at Berkeley, May 21, 2001, 58 pgs.
Kun Zhou et al., "Iso-charts: Stretch-driven Mesh Parameterization using Spectral Analysis", Eurographics Symposium on Geometry Processing (2004), 10 pgs.
Tencent Americas LLC, Korean Office Action, KR Patent Application No. 10-2024-7011844, Feb. 20, 2025, 9 pgs.
Tencent Americas LLC, Extended European Search Report, EP Patent Application No. 23771747.5, Jul. 2, 2025, 11 pgs.
Xiang Zhang et al., "[V-CG] Tencent's Dynamic Mesh Coding CfP Response", International Organization for Standardization, ISO/IEC JTC 1/SC 29/WG 7, Coding of Moving Pictures and Audio, Document: m59295, Apr. 2022, 5 pgs.

\* cited by examiner

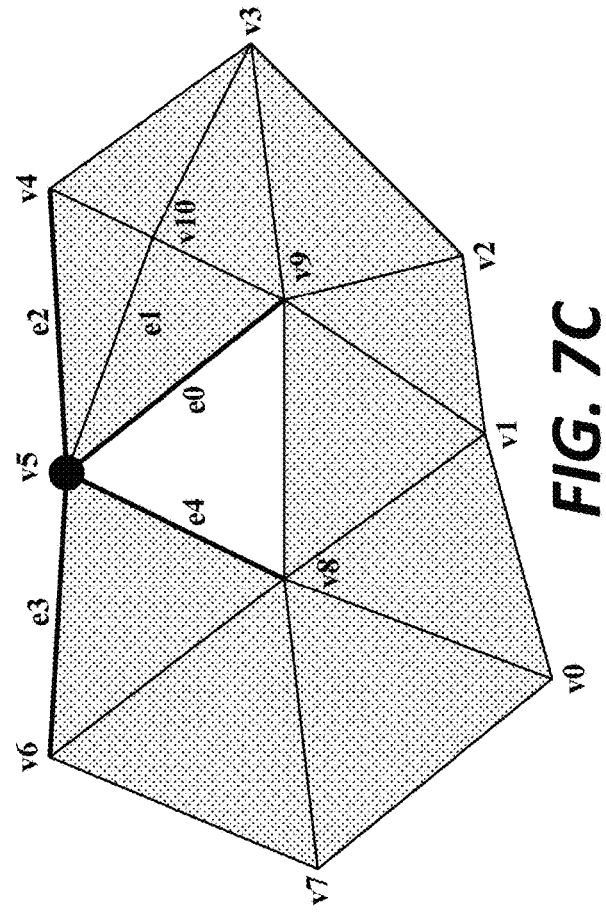
FIG. 7C
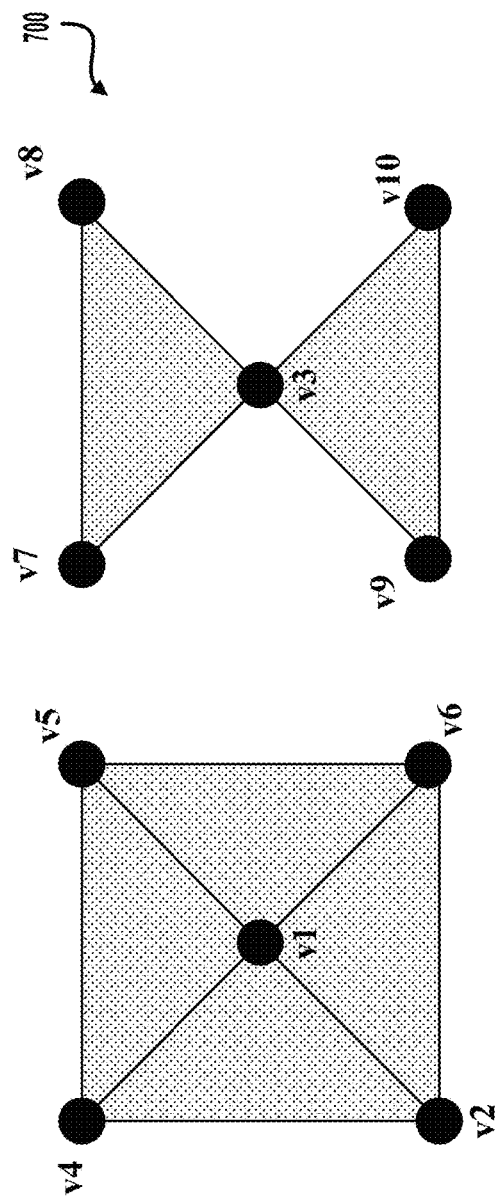
FIG. 7B
FIG. 7A

ATLAS SAMPLING BASED MESH COMPRESSION WITH CHARTS OF GENERAL TOPOLOGY

CROSS-REFERENCE TO RELATED APPLICATION

This application claims priority from U.S. Provisional Application No. 63/326,182, entitled "ATLAS SAMPLING BASED MESH COMPRESSION WITH CHARTS OF GENERAL TOPOLOGY" filed on Mar. 31, 2022, the disclosure of which is incorporated herein by reference in its entirety.

TECHNICAL FIELD

This disclosure is directed to a set of advanced video coding technologies. More specifically, the present disclosure is directed to video based dynamic mesh compression.

BACKGROUND

Advanced three-dimensional (3D) representations of the world are enabling more immersive forms of interaction and communication. To achieve realism in 3D representations, 3D models are becoming ever more sophisticated, and a significant amount of data is linked to the creation and consumption of these 3D models. 3D meshes are widely used to 3D model immersive content.

A 3D mesh may be composed of several polygons that describe the surface of a volumetric object. A dynamic mesh sequence may require a large amount of data since it may have a significant amount of information changing over time. Therefore, efficient compression technologies are required to store and transmit such contents.

While mesh compression standards IC, MESHGRID, FAMC were previously developed to address dynamic meshes with constant connectivity and time varying geometry and vertex attributes. However, these standards do not take into account time varying attribute maps and connectivity information.

Furthermore, it is also challenging for volumetric acquisition techniques to generate a constant connectivity dynamic mesh, especially under real time constraints. This type of dynamic mesh content is not supported by the existing standards.

SUMMARY

According to embodiments, a method for sampling-based dynamic mesh compression may be provided. The method may be executed by at least one processor, and may include determining one or more sample positions associated with an input mesh based on one or more sampling rate; determining an occupancy status associated respectively with each of the one or more sample positions, wherein the occupancy status indicates whether each of the one or more sample positions are within boundaries of one or more polygons defined by the input mesh; generating a sample-based occupancy map based on the occupancy status associated respectively with each of the one or more sample positions; and compressing the sample-based occupancy map using a video codec into a plurality of single-channel or multiple-channel images.

According to embodiments, an apparatus for sampling-based dynamic mesh compression may be provided. The device may include at least one memory configured to store program code; and at least one processor configured to read the program code and operate as instructed by the program code. The program code may include first determining code configured to cause the at least one processor to determine one or more sample positions associated with an input mesh based on one or more sampling rate; second determining code configured to cause the at least one processor to determine an occupancy status associated respectively with each of the one or more sample positions, wherein the occupancy status indicates whether each of the one or more sample positions are within boundaries of one or more polygons defined by the input mesh; first generating code configured to cause the at least one processor to generate a sample-based occupancy map based on the occupancy status associated respectively with each of the one or more sample positions; and compressing code configured to cause the at least one processor to compress the sample-based occupancy map using a video codec into a plurality of single-channel or multiple-channel images.

According to embodiments, a non-transitory computer-readable medium stores computer instructions may be provided. The instructions may include one or more instructions that, when executed by one or more processors of a device for sampling-based dynamic mesh compression, cause the one or more processors to determine one or more sample positions associated with an input mesh based on one or more sampling rate; determine an occupancy status associated respectively with each of the one or more sample positions, wherein the occupancy status indicates whether each of the one or more sample positions are within boundaries of one or more polygons defined by the input mesh; generate a sample-based occupancy map based on the occupancy status associated respectively with each of the one or more sample positions; and compress the sample-based occupancy map using a video codec into a plurality of single-channel or multiple-channel images.

BRIEF DESCRIPTION OF THE DRAWINGS

Further features, the nature, and various advantages of the disclosed subject matter will be more apparent from the following detailed description and the accompanying drawings in which:

FIG. 7A shows a 2D simply connected manifold chart, in accordance with embodiments of the present disclosure.

FIG. 7B shows a 2D simply connected non-manifold chart, in accordance with embodiments of the present disclosure.

FIG. 7C shows a 2D non-simply connected non-manifold chart, in accordance with embodiments of the present disclosure.

DETAILED DESCRIPTION

A mesh may be composed of several polygons that describe the surface of a volumetric object. Its vertices in 3D space and the information of how the vertices are connected may define each polygon, referred to as connectivity information. In some embodiments, vertex attributes, such as colors, normals, etc., may be associated with the mesh vertices. Attributes may also be associated with the surface of the mesh by exploiting mapping information that parameterizes the mesh with 2D attribute maps. Such mapping may be defined using a set of parametric coordinates, referred to as UV coordinates or texture coordinates, and associated with the mesh vertices. 2D attribute maps may be used to store high resolution attribute information such as texture, normals, displacements etc. The high resolution attribute information may be used for various purposes such as texture mapping and shading.

As stated above, a 3D mesh or dynamic meshes may require a large amount of data since it may consist of a significant amount of information changing over time. Existing standards do not take into account time-varying attribute maps and connectivity information. Existing standards also do not support volumetric acquisition techniques that generate a constant connectivity dynamic mesh, especially under real-time conditions.

Therefore, new mesh compression standard to directly handle dynamic meshes with time-varying connectivity information and, in some cases, time-varying attribute maps is needed. Embodiments of the present disclosure enable efficient compression technologies to store and transmit such dynamic meshes with general topology. Embodiments of the present disclosure enable lossy and/or lossless compression for various applications, such as real-time communications, storage, free viewpoint video, AR and VR.

According to an aspect of the present disclosure, methods, systems, and non-transitory storage mediums for dynamic mesh compression are provided. Embodiments of the present disclosure may also be applied to static meshes, where only one frame of the mesh or the mesh content does not change over time.

Figure 1:
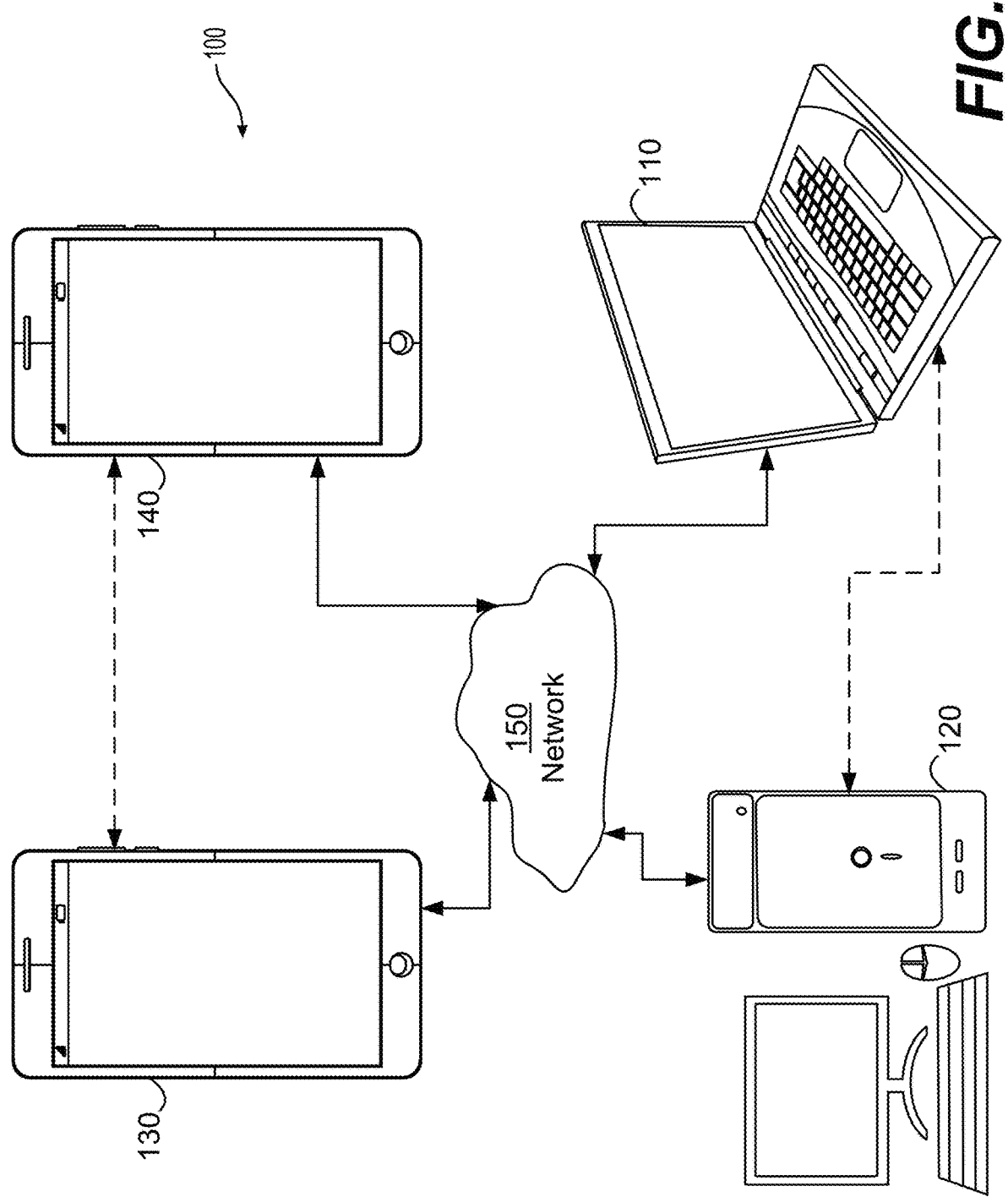
FIG. 1 is a schematic illustration of a simplified block diagram of a communication system, in accordance with embodiments of the present disclosure.
Figure 2:
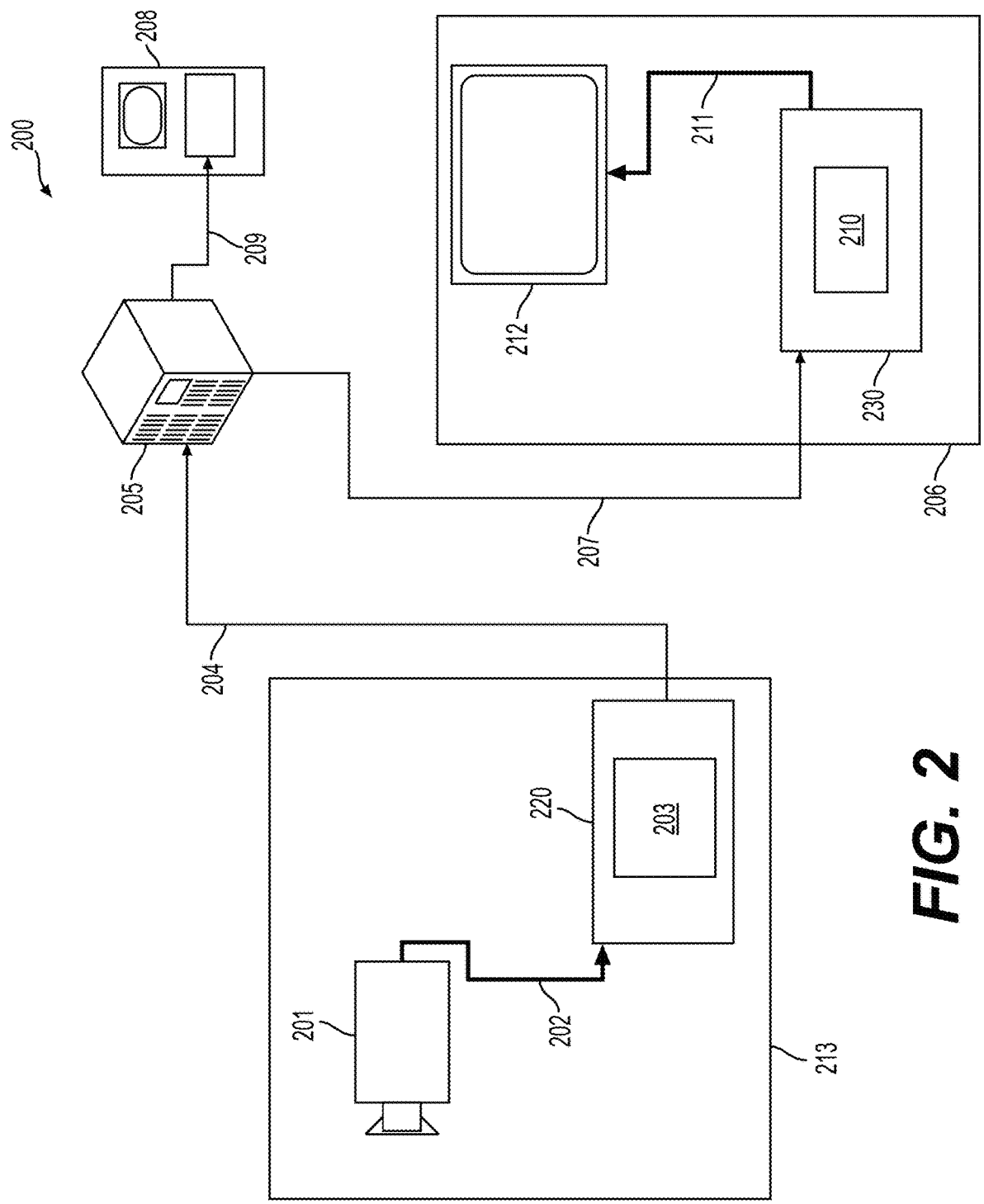
FIG. 2 is a schematic illustration of a simplified block diagram of a streaming system, in accordance with embodiments of the present disclosure.

With reference to FIGS. 1-2, an embodiment of the present disclosure for implementing encoding and decoding structures of the present disclosure are described.

FIG. 1 illustrates a simplified block diagram of a communication system 100 according to an embodiment of the present disclosure. The communication system 100 may include at least two terminals 110, 120 interconnected via a network 150. For unidirectional transmission of data, a first terminal 110 may code video data, which may include mesh data, at a local location for transmission to the other terminal 120 via the network 150. The second terminal 120 may receive the coded video data of the other terminal from the network 150, decode the coded data and display the recovered video data. Unidirectional data transmission may be common in media serving applications and the like.

FIG. 1 illustrates a second pair of terminals 130, 140 provided to support bidirectional transmission of coded video that may occur, for example, during videoconferencing. For bidirectional transmission of data, each terminal 130, 140 may code video data captured at a local location for transmission to the other terminal via the network 150. Each terminal 130, 140 also may receive the coded video data transmitted by the other terminal, decode the coded data and display the recovered video data at a local display device.

In FIG. 1, the terminals 110-140 may be, for example, servers, personal computers, and smart phones, smart TV, and/or any other type of terminals equipped with video codec and network transmission software, etc., to support the relevant applications. The network 150 represents any number of networks that convey coded video data among the terminals 110-140 including, for example, wireline and/or wireless communication networks. The communication network 150 may exchange data in circuit-switched and/or packet-switched channels. Representative networks include telecommunications networks, local area networks, wide area networks, and/or the Internet. For the purposes of the present discussion, the architecture and topology of the network 150 may be immaterial to the operation of the present disclosure unless explained herein below.

FIG. 2 illustrates, as an example of an application for the disclosed subject matter, a placement of a video encoder and decoder in a streaming environment. The disclosed subject matter can be used with other video enabled applications, including, for example, video conferencing, digital TV, storing of compressed video on digital media including CD, DVD, memory stick and the like, and so on.

As illustrated in FIG. 2, a streaming system 200 may include a capture subsystem 213 that includes a video source 201 and an encoder 203. The streaming system 200 may further include at least one streaming server 205 and/or at least one streaming client 206.

The video source 201 can create, for example, a stream 202 that includes a 3D mesh and metadata associated with the 3D mesh. The video source 201 may include, for example, 3D sensors (e.g., depth sensors) or 3D imaging technology (e.g. digital camera(s)), and a computing device that is configured to generate the 3D mesh using the data received from the 3D sensors or the 3D imaging technology. The sample stream 202, which may have a high data volume when compared to encoded video bitstreams, can be processed by the encoder 203 coupled to the video source 201. The encoder 203 can include hardware, software, or a combination thereof to enable or implement aspects of the disclosed subject matter as described in more detail below. The encoder 203 may also generate an encoded video bitstream 204. The encoded video bitstream 204, which may have e a lower data volume when compared to the uncompressed stream 202, can be stored on a streaming server 205 for future use. One or more streaming clients 206 can access the streaming server 205 to retrieve video bit streams 209 that may be copies of the encoded video bitstream 204.

The streaming clients 206 can include a video decoder 210 and a display 212. The video decoder 210 can, for example, decode video bitstream 209, which is an incoming copy of the encoded video bitstream 204, and create an outgoing video sample stream 211 that can be rendered on the display 212 or another rendering device (not depicted). In some streaming systems, the video bitstreams 204, 209 can be encoded according to certain video coding/compression standards.

Figure 3:
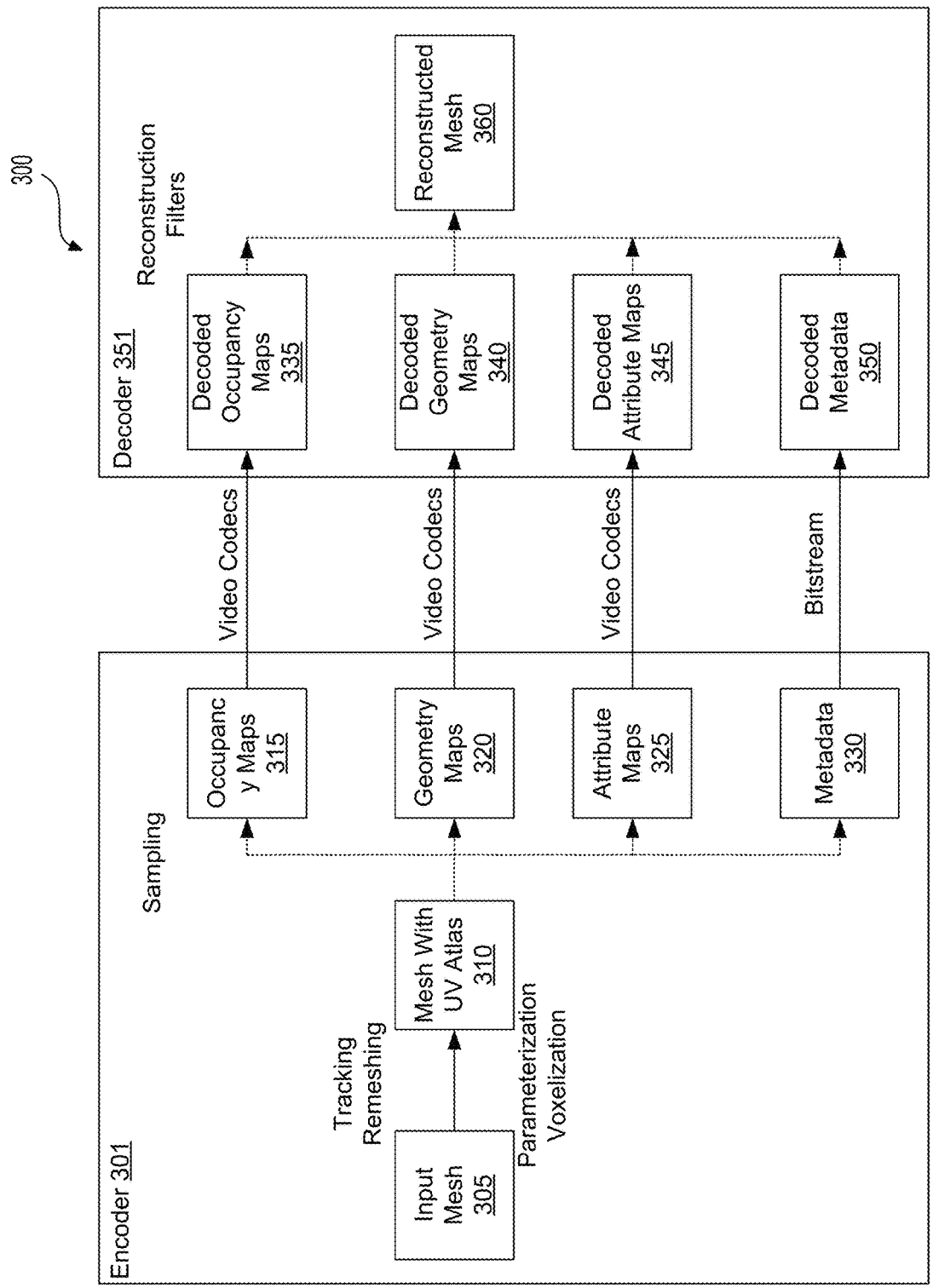
FIG. 3 is a schematic illustration of a simplified block diagram of a video encoder and decoder, in accordance with embodiments of the present disclosure.

FIG. 3 is an exemplary diagram of a framework 300 for dynamic mesh compression and mesh reconstruction using encoders and decoders.

As shown in FIG. 3, the framework 300 may include an encoder 301 and a decoder 351. The encoder 301 may include an input mesh 305, which is converted into mesh with UV atlas 310, and the mesh with UV atlas 310 is then converted into occupancy maps 315, geometry maps 320, attribute maps 325, and metadata 330. The decoder 351 may include decoded occupancy maps 335, decoded geometry maps 340, decoded attribute maps 345, decoded metadata 350, and reconstructed mesh 360.

According to an aspect of the present disclosure, the input mesh 305 may include one or more frames, and each of the one or more frames may be preprocessed by a series of operations and used to generate the mesh with UV atlas 310. As an example, the preprocessing operations may include, but not limited to, tracking, parameterization, remeshing, voxelization, etc. In some embodiments, the preprocessing operations may be performed only on the encoder side and not the decoder side.

The mesh with UV atlas 310 may be a 2D mesh. The 2D mesh with UV atlas may be a mesh in which each vertex of the mesh may be associated with UV coordinates on a 2D atlas. The mesh with the UV atlas 310 may be processed and converted into a plurality of maps based on sampling. As an example, the UV atlas 310 may be processed and converted into occupancy maps, geometry maps, and attribute maps based on sampling the 2D mesh with UV atlas. The generated occupancy maps 335, geometry maps 340, and attribute maps 345 may be encoded using appropriate codecs (e.g., HVEC, VVC, AV1, etc.) and transmitted to a decoder via a network. In some embodiments, metadata (e.g., connectivity information etc.) may also be transmitted to the decoder.

According to an aspect, the decoder 351 may receive the encoded occupancy maps, geometry maps, and attribute maps from an encoder. The decoder 315 may use appropriate techniques and methods, in addition to embodiments described herein, to decode the occupancy maps, geometry maps, and attribute maps. In an embodiment, decoder 351 may generate decoded occupancy maps 335, decoded geometry maps 340, decoded attribute maps 345, and decoded metadata 350. The input mesh 305 may be reconstructed into reconstructed mesh 360 based on the decoded occupancy maps 335, decoded geometry maps 340, decoded attribute maps 345, and decoded metadata 350 using one or more reconstruction filters and techniques. In some embodiments, the metadata 330 may be directly transmitted to decoder 351 and the decoder 351 may use the metadata to generate the reconstructed mesh 360 based on the decoded occupancy maps 335, decoded geometry maps 340, and decoded attribute maps 345. Post-filtering techniques, including but not limited to remeshing, parameterization, tracking, voxelization, etc., may also be applied on the reconstructed mesh 360.

The input meshes with 2D UV atlases may have vertices, each vertex may have an associated set of UV coordinates on the 2D atlas. The occupancy map, geometry map, and attribute map may be generated by sampling one or more points/positions on the UV atlas. Each sample position, if it is inside a polygon defined by the mesh vertices, may be occupied or unoccupied. For each occupied sample position, one can calculate its corresponding 3D geometry coordinates and attributes by interpolating from the associated set of polygon vertices.

According to an aspect of the present disclosure, the sampling rate may be consistent over the whole 2D atlas. In some embodiments, the sampling rate for u and v axes may be different, making anisotropic remeshing possible. In some embodiments, the whole 2D atlas may be divided into multiple regions, such as slices or tiles, and each such region may have a different sampling rate.

According to an aspect of the present disclosure, the sampling rate for each region (or the entire 2D atlas) may be signaled in a high-level syntax, including but not limited to sequence header, frame header, slice header, etc. In some embodiments, sampling rate for each region (or the entire 2D atlas) may be chosen from a pre-established set of rates that have been assumed by both the encoder and decoder. Because the pre-established set of rates that are known by both the encoder and decoder, signaling of one particular sampling rate would require only signaling the index in the pre-established rate set. An example of such a pre-established set may be every 2 pixels, every 4 pixels, every 8 pixels, etc. In some embodiments, the sampling rate for each region (or the entire 2D atlas) of a mesh frame may be predicted from a pre-established rate set, from a previously used sampling rate in other already coded regions of the same frame, or from a previously used sampling rate in other already coded mesh frames.

In some embodiments, the sampling rate for each region (or the entire 2D atlas) may be based on some characteristic of each region (or the entire 2D atlas). As an example, the sample rate can be based on activity—for a rich-textured region (or the entire 2D atlas), or a region (or the entire 2D atlas) with high activity, the sample rate could be set higher. As another example, for a smooth region (or the entire 2D atlas), or a region (or the entire 2D atlas with low activity, the sample rate could be set lower.

In some embodiments, the sampling rate for each region (or the entire 2D atlas) of a mesh frame may be signaled in a way that combination of prediction and direct signaling may be allowed. The syntax may be structured to indicate if a sampling rate will be predicted or directly signaled. When predicted, which of the predictor-sampling rate to be used may be further signaled. When directly signaled, the syntax to represent the value of the rate may be signaled.

Figure 4:
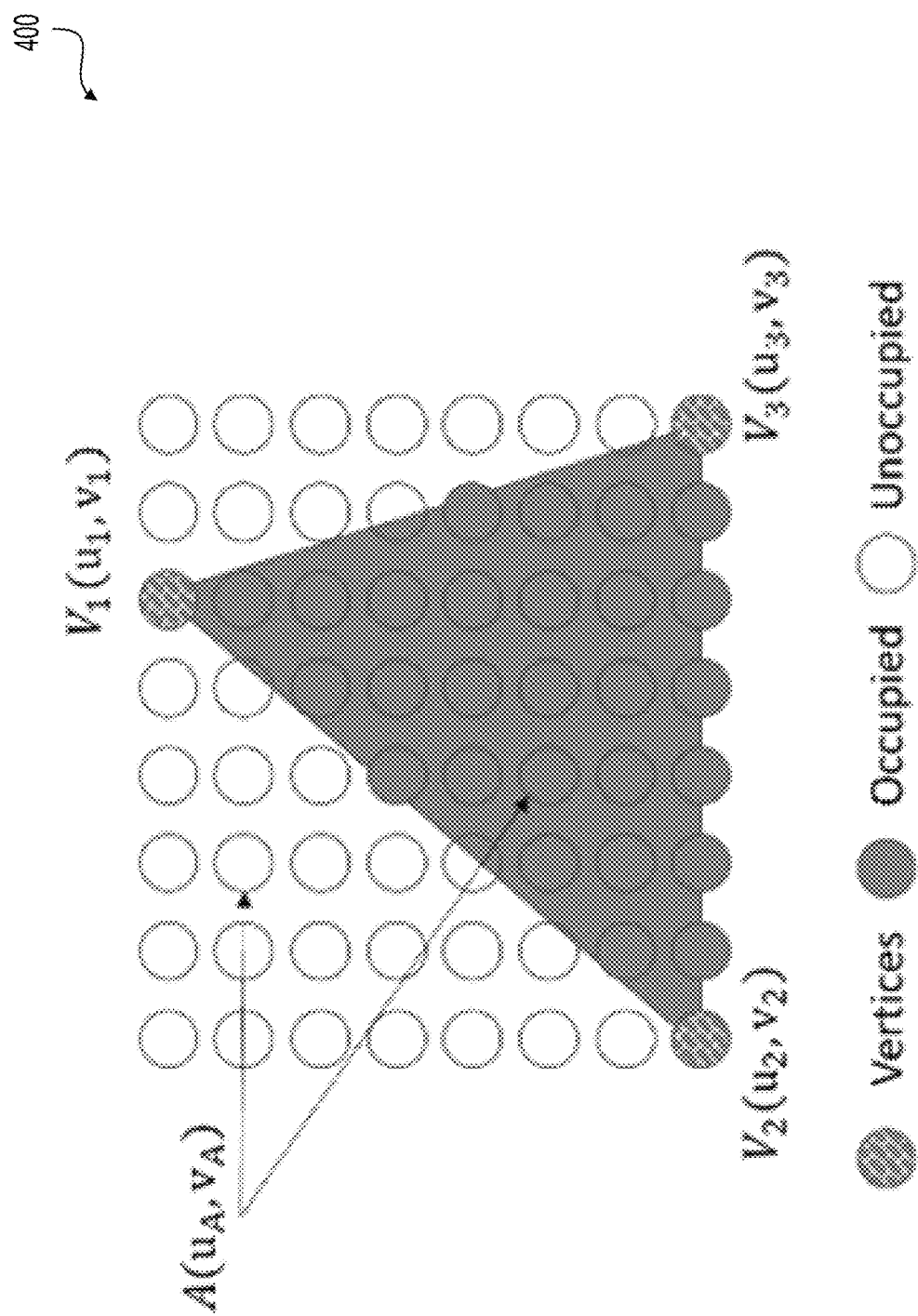
FIG. 4 is an exemplary illustration of 2D atlas sampling of meshes, in accordance with embodiments of the present disclosure.

FIG. 4 is an exemplary illustration of 2D atlas sampling of a triangle mesh 400, in accordance with embodiments of the present disclosure.

As shown in FIG. 4, the triangle mesh 400 has a plurality of positions and vertices, wherein each integer pixel is merely represented as a circle. Other forms of representations may be used.

Let $V_1, V_2, \ldots, V_D$ denote the vertices of a polygon on a mesh, where D defines the shape of each polygon. For triangle meshes, D equals to 3, i.e., each triangle has 3 vertices. Without losing generality, we assume the meshes are composed of triangle meshes for the rest of the disclosure, i.e., D=3.

For each vertex $V_i$, its UV coordinates are denoted as $(u_i, v_i)$, its 3D position is denoted as $(x_i, y_i, z_i)$, and its other attributes (such as colors and normal) can be denoted as $a_i$. The UV coordinates of vertices, i.e., $(u_i, v_i)$, may be on integer or fractional positions. The 2D UV atlas of the input mesh may be of the size of W×H and A may be a sample point on the 2D UV atlas with coordinate $(U_A, V_A)$. If A is inside a triangle of the 2D UV atlas defined by the UV coordinates $(u_i, v_i)$ of its 3 vertices $V_1, V_2, V_3$, then it can be marked as occupied; otherwise, it can be marked as unoccupied.

According to an aspect of the present disclosure, occupancy maps may be generated based on sampling the 2D UV atlases (sometimes meshes). The connectivity of the points and/or positions on the occupancy maps may be signaled (e.g., using metadata or in SPS, PPS, etc.) or be inferred by the decoder. The orientation of the connectivity (clockwise or counterclockwise) may be either signaled in high-level syntax, such as sequence header, slice header, etc., or fixed (assumed) by encoder and decoder.

In an embodiment, a one-channel binary occupancy map may be generated by scanning all the sampling points on the 2D map. Each point on the one-channel binary occupancy map may indicate whether the sample point is inside of any triangles (or other shapes of the mesh polygon) or not. In an embodiment, one-channel non-binary occupancy maps may be generated using other values to indicate whether a sample point belongs to a vertex position or a boundary. Multiple-channel occupancy maps, where different channels can have different indications, may also be generated. In some embodiments, occupancy maps with only vertex positions may be generated. The connectivity of these vertices may be either signaled to or inferred by the decoder.

Occupancy maps may be compressed by any appropriate image and video codecs. They may be compressed as single-channel or multiple-channel images, e.g., YUV420, YUV400, YUV444, RGB444, etc. They may also be compressed as binary images or arbitrary bit-depth images, e.g., 1-bit, 2-bit, 8-bit, 12-bit, 16-bit, etc. It can be compressed by lossy or lossless codecs.

According to an aspect of the present disclosure, geometry maps may be generated based on sampling the 2D UV atlases (sometimes meshes). Unlike ordinary images with RGB colors, geometry maps may store the 3D geometry coordinates of the corresponding sample points in their channels. For each occupied sample point A in the 2D UV atlas, its 3D geometry position may be interpolated by the 3 vertices of the triangle ($V_1$, $V_2$, $V_3$). Any appropriate interpolation method may be adopted here. For example, a barycenter-based method may be used to estimate the 3D geometry position of A.

As an example, suppose ($\lambda_1$, $\lambda_2$, $\lambda_3$) are the barycentric coordinates of A with respect to the triangle ($V_1$, $V_2$, $V_3$), then $$(u_A, v_A) = \lambda_1 \cdot (u_1, v_1) + \lambda_2 \cdot (u_2, v_2) + \lambda_3 \cdot (u_3, v_3) \qquad \text{Eqn (1)}$$

$$\lambda_1 + \lambda_2 + \lambda_3 = 1. \qquad \text{Eqn (2)}$$

For a linear relation between UV coordinates and 3D coordinates, the 3D position of $A_{u,v}$, i.e., ($x_A$, $y_A$, $z_A$), may be calculated as follows:

$$(x_A, y_A, z_A) = \lambda_1 \cdot (x_1, y_1, z_1) + \lambda_2 \cdot (x_2, y_2, z_2) + \lambda_3 \cdot (x_3, y_3, z_3) \qquad \text{Eqn (3)}$$

In some embodiments, the estimated 3D geometry position of A, i.e., ($x_A$, $y_A$, $z_A$), may be converted to unsigned integers in order to be coded by image and video codecs.

For unoccupied point A, its 3D geometry positions ($x_A$, $y_A$, $z_A$) can be any arbitrary numbers. In some embodiments, to facilitate the coding efficiency of geometry maps, the 3D geometry positions of unoccupied points may be assigned to be similar to their spatial and temporal neighbors. In some embodiments, the 3D geometry positions of unoccupied points can be assigned with a non-possible value for a geometry position, e.g., (−1, −1, −1), in which case the occupancy maps may not be signaled.

To generate geometry maps associated with the sampled positions, according to an aspect of the present disclosure, a 3-channel geometry map may be generated by scanning all the sampling points on the 2D map where each point on the 3-channel geometry map indicates its 3D geometry positions. As an example, the first channel may indicate the x positions, the second channel may indicate the y positions, and the third channel may indicate the z positions. In some embodiments, the three single-channel geometry maps where each map indicates 3D geometry positions of one axis may be generated. As an example, the first map may indicate the x positions, the second map may indicate the y positions, and the third map may indicate the z positions. In some embodiments, a single-channel geometry map that indicates the depth (distance) to a projection plane may be generated. The projection plane may be different for different triangles, in which case the projection plane information may be signaled as side-information to the decoder.

According to an aspect of the present disclosure, attribute maps may be generated based on sampling the 2D UV atlases (sometimes meshes).

Each occupied sample point A may have attributes, and its attributes (e.g., normal, colors) may be interpolated by the 3 vertices of the triangle ($V_1$, $V_2$, $V_3$). Any appropriate interpolation method may be adopted.

As an example, suppose ($\lambda_1$, $\lambda_2$, $\lambda_3$) are the barycentric coordinates of A with respect to the triangle ($V_1$, $V_2$, $V_3$), then $$(u_A, v_A) = \lambda_1 \cdot (u_1, v_1) + \lambda_2 \cdot (u_2, v_2) + \lambda_3 \cdot (u_3, v_3) \qquad \text{Eqn (4)}$$

$$\lambda_1 + \lambda_2 + \lambda_3 = 1. \qquad \text{Eqn (5)}$$

The attribute values of $A_{u,v}$, i.e., $\alpha_A$, can be calculated as follows:

$$\alpha_A = \lambda_1 \cdot \alpha_1 + \lambda_2 \cdot \alpha_2 + \lambda_3 \cdot \alpha_3 \qquad \text{Eqn (6)}$$

In some embodiments, for each unoccupied point A, its attribute $\alpha_A$ may be arbitrary numbers. In some embodiments, to facilitate the coding efficiency of attribute maps, the attribute values of unoccupied points may be assigned to be similar to their spatial and temporal neighbors. In some embodiments, the attribute values of unoccupied points can be assigned with a non-possible value for an attribute, e.g., (−1, −1, −1), in which case the occupancy maps may not be signaled.

To generate attribute maps associated with the sampled positions, according to an aspect of the present disclosure, a N-channel attribute map where each point on the map indicates its attribute values may be generated by scanning all the sampling points on the 2D map. As an example, for attributes that are colors, the first channel may indicate the R colors, the second channel may indicate the G colors, and the third channel may indicate the B colors. In embodiments where the attributes are normals, the 3 channels can be normal values on x, y, and z axes. In some embodiments, N single-channel attribute maps where each map indicates an attribute value may be generated. As an example, for attributes that are colors, the first map may indicate the R colors, the second map may indicate the G colors, and the third map may indicate the B colors. In some embodiments, the texture maps associated with the mesh may be viewed as additional attribute maps and coded by any appropriate image or video codecs.

Figure 5:
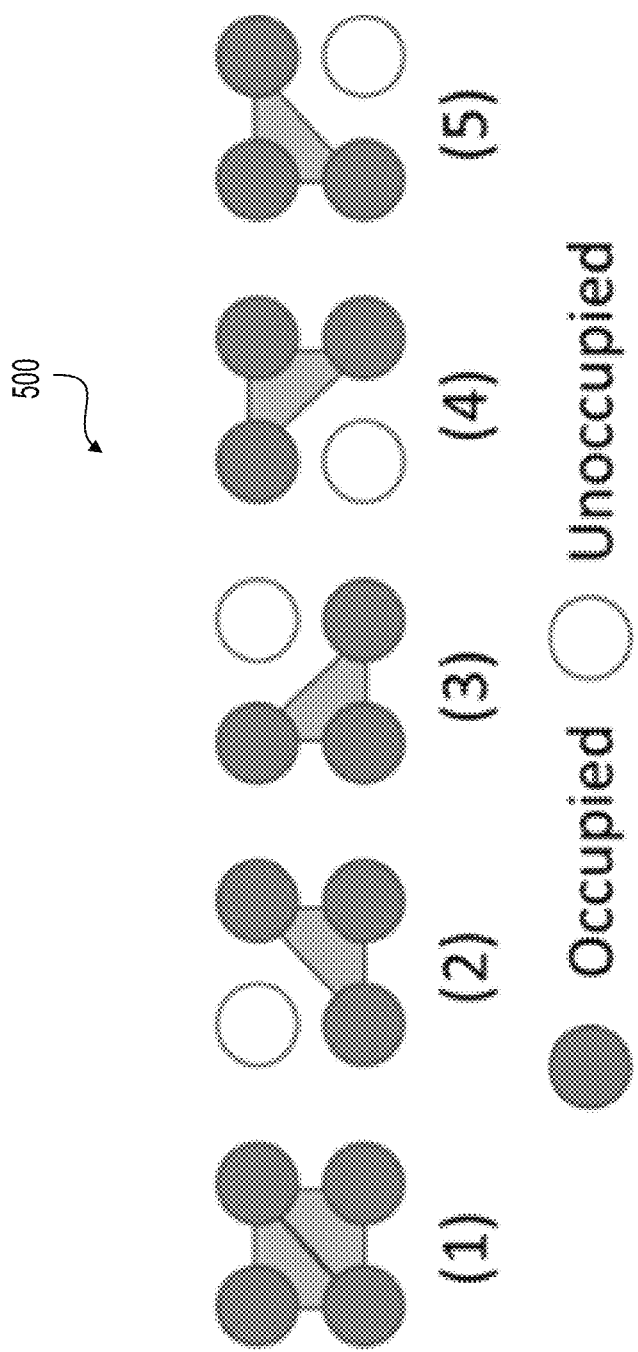
FIG. 5 is an exemplary illustration of connectivity in meshes, in accordance with embodiments of the present disclosure.

FIG. 5 illustrates examples of connectivity in meshes that may be used to generate connectivity information by an encoder and reconstruct the meshes by a decoder, in accordance with embodiments of the present disclosure.

A decoder may reconstruct the mesh after decoding the occupancy, geometry and attribute maps. For each occupied point on the occupancy map, the decoder may recover one or more vertices on the mesh, and the corresponding geometry and attribute values of the point may be obtained from the corresponding positions in the decoded geometry and attribute maps. The connectivity information among the vertices may be recovered by the decoder by either implicitly inferring from the occupied positions or explicitly signaling.

According to an aspect of the present disclosure, the connectivity information associated with the input mesh and/or 2D UV atlas may be implicitly inferred from the occupancy status of neighboring points on decoded occupancy maps by certain rules. The orientation of the connectivity (clockwise or counterclockwise) may be parsed from high-level syntax, such as sequence header, slice header, etc., or fixed (assumed) by encoder and decoder. According to some embodiments, the reconstructed mesh may have different connectivity from the input mesh. As an example, the input mesh may be a triangle mesh, while the reconstructed mesh may be a quad mesh.

According to an aspect of the present disclosure, for every 4 neighboring points on the decoded occupancy map, if the number of occupied points is larger than or equal to 3, the connectivity of triangles among the 4 points can be inferred by certain rules. As an example, if 3 out of 4 points are occupied, they can be connected directly to form a triangle as shown in examples (2)-(5) of FIG. 5. As an example, if 4 points are all occupied, they can form two triangles as shown in example (1) of FIG. 5. In some embodiments, different rules may be applied to different numbers of neighboring points.

In some embodiments, a quad mesh may be reconstructed, when the 4 neighboring points are all occupied. In some other embodiments, the reconstructed mesh may be a hybrid type mesh, e.g., some regions in the mesh frame generate triangle meshes while other regions generate quad meshes. The connectivity type can be signaled in high-level syntax, such as sequence header or slice header.

In some embodiments, the connectivity information may also be reconstructed by explicitly signaling. If a polygon cannot be recovered by implicit rules, the encoder may signal the connectivity information, e.g., as metadata in the bitstream. Any appropriate means to reduce the overhead of the explicit signaling, such as depending on the boundaries of polygons may be used.

Figure 6:
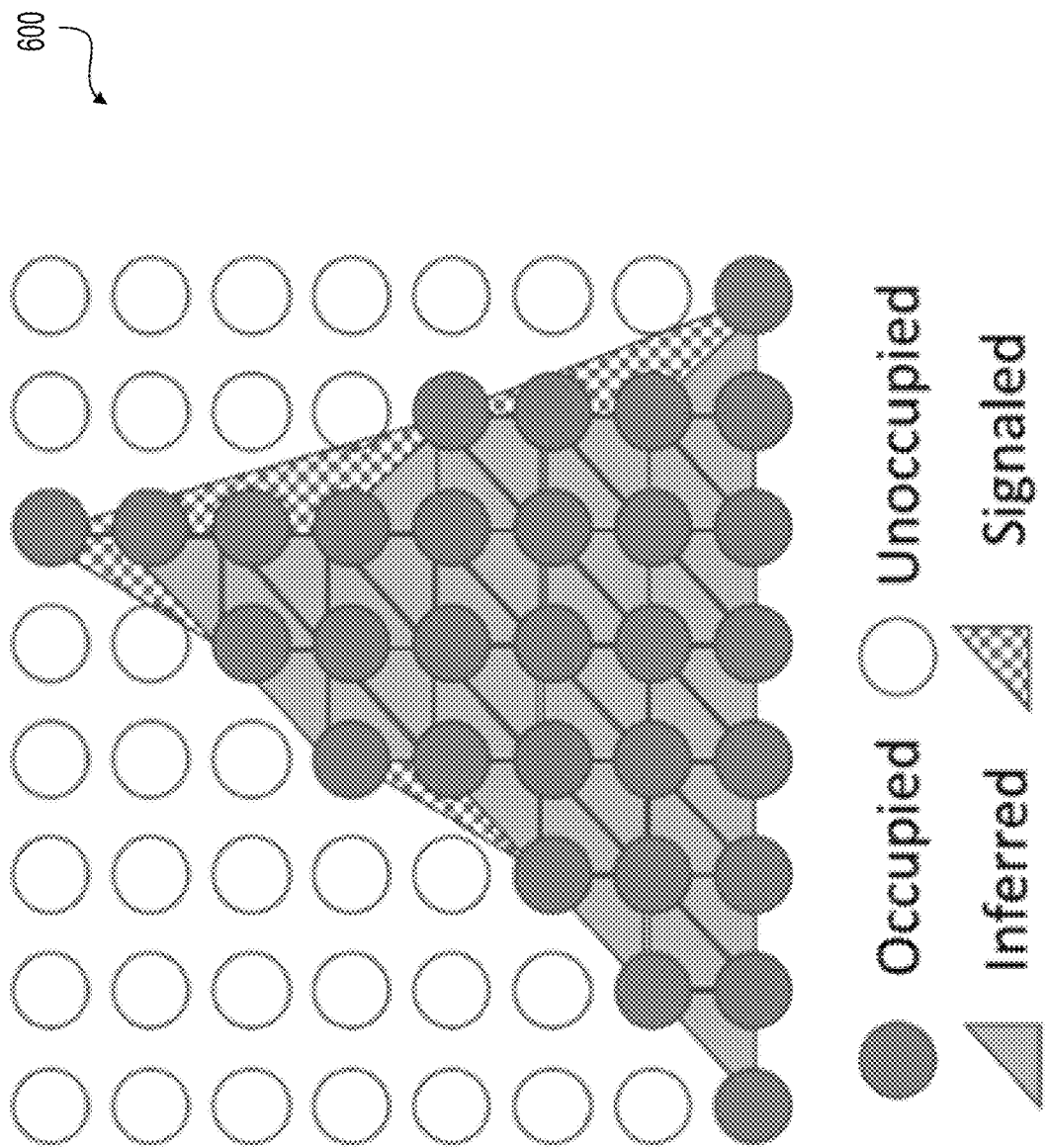
FIG. 6 is an exemplary illustration of a reconstructed mesh, in accordance with embodiments of the present disclosure.

FIG. 6 is an exemplary illustration of a reconstructed mesh 600 generated using a combination of the implicit rules described in FIG. 5, and explicit signaling.

When the atlas sampling-based methods are used for mesh compression, the geometry information of a mesh is coded as a geometry image sampled from the 2D UV atlases. As depicted in FIGS. 7A-7C, the UV atlases 700 may or may not be manifold charts (also known as "UV charts") and may or may not be simply connected. A 2D UV chart is a manifold chart when every vertex in the chart has a neighborhood being homeomorphic to an open disk or half disk. A 2D UV chart is a 2D simply connected chart when every vertex in the chart is path-connected and every path between two points is homotopic to any other path between the same two points.

For example, FIG. 7A shows a 2D simply connected manifold chart, in accordance with embodiments of the present disclosure. FIG. 7B shows a 2D simply connected non-manifold chart, in accordance with embodiments of the present disclosure. The 2D simply connected non-manifold chart looks like a bowtie, where two or more regions touch at a single point (e.g., vertex v3). The vertex v1 is an interior vertex and thus is a regular vertex. The vertices v2 and v4-v10 are boundary vertices and respectively satisfy Eq. (1), and are regular vertices. For example, the vertex v2 has two incident faces and 3 incident edges; the vertex v4 has two incident faces and 3 incident edges; the vertex v5 has two incident faces and 3 incident edges; the vertex v6 has two incident faces and 3 incident edges; the vertex v7 has one incident face and 2 incident edges; the vertex v8 has one incident face and 2 incident edges; the vertex v9 has one incident face and 2 incident edges; the vertex v10 has one incident face and 2 incident edges. In contrast, the vertex v3 is a boundary vertex and has two incident faces and four incident edges. Thus, the vertex v3 does not satisfy Eq. (1) and is a singular vertex.

According to another aspect of the disclosure, singular vertices can be identified by the number of incident boundary edges. For example, regular boundary vertices can only have 2 incident boundary edges while singular boundary vertices have more than 2 incident boundary edges.

According to some aspects of the disclosure, to detect boundary loops in a non-manifold mesh, the non-manifold mesh can be converted to a manifold mesh without affecting the boundary loop configuration, thus the boundary loops in the manifold mesh can correspond to the boundary loops in the non-manifold mesh. The boundary loops of the manifold mesh can be detected by suitable algorithm. Based on the boundary loops of the manifold mesh, the corresponding boundary loops of the non-manifold mesh can be determined.

In some examples, the boundary loop detection procedure for non-manifold meshes includes three steps that are referred to as a first step, a second step and a third step.

In the first step (that is also referred to as topological surgery step), for each singular vertex of the mesh, incident edges can be indexed (e.g., ordered) in either clockwise or counterclockwise direction into a cyclic sequence. In the cyclic sequence, the first incident edge and the last incident edge are consecutive incident edges. Based on the cyclic sequence of incident edges to the singular vertex, loop edge pairs can be detected. A loop edge pair is defined as 2 consecutive incident edges in the cyclic sequence that are not edges of a same face. It is noted that due to the cyclic nature of the indexing, the modular arithmetic convention can be used to define the first and last incident edges as a loop edge pair, provided the first and last incident edges are not edges of the same face.

For each loop edge pair, two incident faces can be identified and an alias vertex can be split from the singular vertex to replace the singular vertex in the two identified incident faces. The alias vertex can be configured to have only two incident boundary edges that are the loop edge pair. Specifically, in an example, the original index of the singular vertex in the two identified incident faces can be replaced with a new index and the new index is recorded as an alias of the original index of the singular vertex.

After the first step (topological surgery step), the non-manifold mesh becomes a manifold mesh.

In the second step (that is referred to as boundary loop detection step), boundary loops of the manifold mesh can be detected by a suitable algorithm developed to detect boundary loops in manifold meshes.

In the third step (that is referred to as boundary loops of non-manifold mesh), after boundary loops of the manifold mesh are determined, the new indices can be replaced with the original ones according to the alias relationship to determine the corresponding boundary loops of the non-manifold mesh.

In some examples, a verification operation can be performed in the third step. The verification operation can verify whether the number of detected interior boundary loops in the non-manifold mesh matches the number of holes detected based on the Euler characteristic and Betti numbers.

According to an aspect of the disclosure, the relationship between the Euler characteristic x and Betti numbers for a simply connected mesh can be expressed as in Eq. (7)

$$\chi \triangleq k_0 - k_1 + k_2 = b_0 - b_1 + b_2 \qquad \text{Eq. (7)}$$

where $k_i (i=0,1,2)$ is the number of i-th simplexes, and $b_i (i=0,1,2)$ is the i-th Betti number. For example, $b_0$ is the number of connected components, which equals to the number of connected exterior boundaries, and $b_1 = h + 2g$, where h is the number of holes enclosed by interior boundary edges and g is the number of "handles", namely genus, and $b_2$ is the number of holes enclosed by closed 2-manifolds. In some examples, $k_i$ (i=0,1,2,3) and $b_0$ can be computed. When $b_2$ and g can be computed, the number of holes enclosed by interior boundary edges can be deduced from Eq. (7), which is the expected number of interior boundary loops in the simply connected mesh.

Further, according to an aspect of the disclosure, the 2 vertices of a singular edge are singular vertices. The topological surgery in the first step can be applied to the vertices of the singular edges in simplicial 2-complex meshes to convert the non-manifold meshes to manifold meshes in order to detect the boundary loops in the non-manifold meshes.

FIG. 7C shows a 2D non-simply connected non-manifold chart, in accordance with embodiments of the present disclosure. In this example, the 2D non-simply connected non-manifold chart includes vertices v0 to v10 and it has a single point (e.g., vertex v5) that is touched by two more regions and also a "hole" in the chart as illustrated in FIG. 7C.

The vertex v10 is an interior vertex, thus is a regular vertex. The vertices v0 to v9 are boundary vertices. The vertices v0-v4 and v6-v9 respectively have two incident boundary edges, and thus are regular boundary vertices. The vertex 5 has 4 incident boundary edges and is a singular vertex.

According to an aspect of the disclosure, the three-step boundary loop detection procedure for non-manifold meshes as described above can be applied to the 2D non-simply connected non-manifold chart to detect boundary loops.

In some examples, the boundary loop detection results can be verified according to the Euler characteristic and Betti numbers. In the FIG. 7C example, the Euler characteristic $\chi = 11 - 22 + 11 = 0$, and the Betti numbers $b_0 = 1$, $b_2 = 0$, genus g=0, so the expected number of holes is $h = b_1 - 2g = b_0 + b_2 - \chi - 2g = 1$. Thus, according to the Euler characteristic and Betti numbers, there is one hole (interior boundary loop) in the mesh which matches the result from the boundary loop detection procedure for non-manifold meshes.

According to an aspect of the disclosure, the boundary loop detection procedure for non-manifold meshes can be generalized to handle higher dimensional simply connected meshes. For example, for simply connected meshes 3D meshes, the topological surgery in the first step can be similarly performed to split singular vertices/edges in 3D, such as the vertices/edges touched by 2 or more tetrahedrons, to convert a non-manifold mesh to a 3D manifold mesh. Then, the "boundary surface" can be determined in the 3D manifold mesh.

It is also noted that the boundary loop detection procedure can be applied for meshes that are not made of simplexes. In some examples, the meshes that are not made of simplexes can be remeshed to meshed with simply connected complexes. For example, quadrilateral meshes can be divided into triangular meshes. Then, the boundary loop detection procedure can be applied to the meshes with simplicial complexes.

According to an aspect of the disclosure, a number of methods are proposed to improve existing atlas sampling-based mesh compression methods for UV charts with general topology. For example, a 2D UV chart is a regular chart if it is manifold and simply connected (as shown in FIG. 7A); otherwise, the 2D UV chart is an irregular chart (as shown in FIGS. 7B and 7C).

In some embodiments, the problem of atlas sampling-based mesh compression irregular charts can be addressed by reparameterizing the mesh before mesh compression using algorithms that generate regular UV charts using such algorithms like the iso-charts algorithm. After reparameterization, for each UV chart, it is determined by the encoder 301 whether the UV chart is regular or not and then converts the irregular UV charts into regular UV charts. After converting the irregular UV charts into regular UV charts, the existing atlas sampling-based methods can be applied readily without any change, and no additional information needs to be signaled in the bitstream. Another advantage of the reparameterization preprocessing is that, with carefully tuned algorithms, it is possible to reduce the number of UV charts and/or produce spatially and/or temporally coherent UV charts to improve the mesh compression efficiency.

In some other embodiments, it is determined whether a UV chart is regular or not. For example, as shown in FIG. 7B, non-manifold vertices are identified if the number of incident boundary edges of a vertex is not 2; and as shown in FIG. 7C, the number of "holes" in a UV chart is derived by calculating the Euler characteristic of the UV chart. If the UV chart is regular, the existing atlas sampling-based methods can be used to process the chart. Otherwise, a boundary loop detection algorithm, such as the one based on topological surgery, is used to detect all boundary loops of the charts, including the exterior boundary loop and interior boundaries loops that enclose the "holes". Note that there can be only one exterior boundary loop for a chart no matter it is regular or irregular. All the boundary loop information (including exterior and interior boundaries) will be signaled in the bitstream in order to properly reconstruct meshes.

In one embodiment, the number of boundary loops and the length of each boundary loop is signaled in the bitstream. A protocol may be established between the encoder 301 and the decoder 351 on how to sort the boundary loops in a predefined manner. For example, one predefined manner is to signal the total number of boundary loops in the bitstream first before signaling other boundary loop information. Thus, if the total number of boundary loops is 1, it means that the UV chart has no holes inside. Another predefined manner is to signal the information of the exterior boundary loop before the other interior loops in the bitstream. Each boundary loop will be signaled, which includes the UV and 3D coordinates of the boundary vertices and the mapping between these two types of coordinates.

In another embodiment, the length of each boundary loops can be predicted or inferred from decoder side. For example, a protocol may be established between the encoder 301 and the decoder 351 such that, if the prediction residual of the boundary vertices (either XYZ or UV coordinates) is larger than a threshold, it can indicate a new boundary loop from the current vertex. The threshold can be either fixed for the encoder 301 and decoder 351, or signaled in the bitstream.

In some embodiments, the decoder 351 decodes the boundary loop information from the bitstream and uses the decoded boundary loops of each UV chart for triangulation (connecting vertices into faces) of that UV chart. For example, if only one boundary loop is signaled for a UV chart, the decoder 351 then uses the existing method to triangulate the UV chart. Otherwise, the decoder 351 determines that there are one or more internal boundary loops in a UV chart. The exterior and interior boundary loops will be decoded from the bitstream and specified in a triangulation algorithm. As a result, the "holes" enclosed by the interior boundaries will not be triangulated. In this way, meshes will be properly reconstructed by the atlas sampling-based methods regardless of the topologies of the UV charts.

Figure 8:
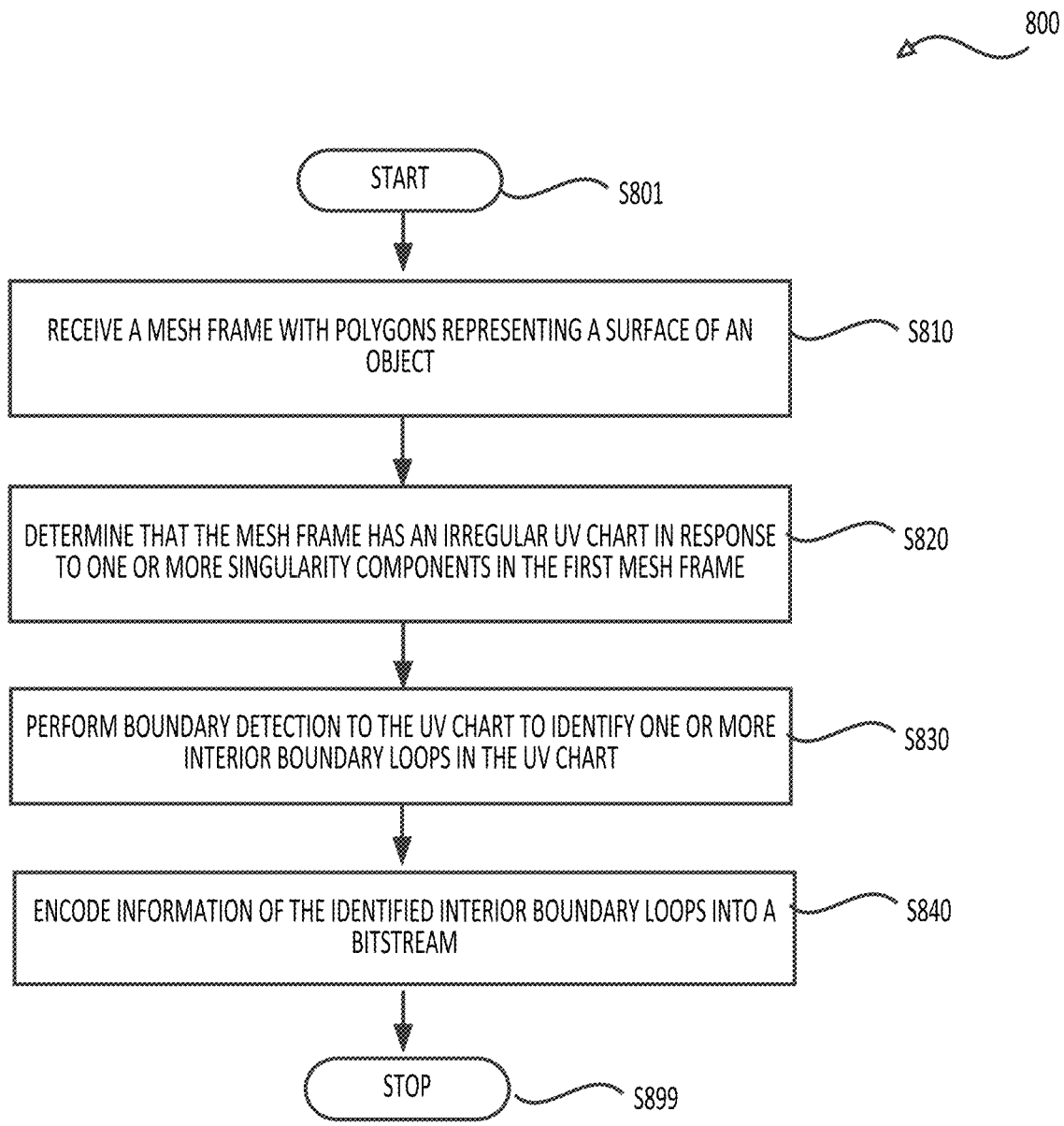
FIG. 8 is a flow diagram illustrating compression using atlas sampling, in accordance with embodiments of the present disclosure.

FIG. 8 is a flow diagram illustrating a process 800 for encoding a 2D UV chart using atlas sampling-based dynamic mesh compression, in accordance with embodiments of the present disclosure.

At operation S801, the encoder 301 starts the atlas sampling-based dynamic mesh compression process.

At operation S810, the encoder 301 receives a mesh frame with polygons representing a surface of an object. In some embodiments, one or more sample positions associated with the mesh frame may be determined based on one or more sampling rates. As an example, the encoder 301 may determine one or more sample positions associated with an input mesh frame 305 based on one or more sampling rates. In some embodiments, the encoder 301 may determine one or more sample positions associated with a processed mesh with UV atlas 310 based on the one or more sampling rates.

In some embodiments, the one or more sampling rates may be based on a first sampling rate for a first axis and a second sampling rate for a second axis. In some embodiments, the one or more sampling rates may be signaled in a high-level syntax. In some embodiments, the input mesh and/or the processed mesh may be divided into one or more regions, and the one or more sampling rates may be based on one or more respective sampling rates for each of the one or more regions. In some embodiments, the one or more respective sampling rates for each of the one or more regions may be based on a respective characteristic of the one or more regions. The respective characteristic may include a texture of a region, an activity of the region, and a smoothness of the region. In some embodiments, the one or more sampling rates may be based on a sampling rate of a neighboring region. In some embodiments, the one or more sampling rates may be based on a previous one or more sampling rates of one or more already coded mesh frames.

At operation S820, the encoder 301 determines whether the mesh frame is associated with an irregular UV chart in response to one or more singularity components in the mesh frame. For example, a 2D UV chart is a regular chart if it is manifold and simply connected. As shown in FIG. 7A, the vertex v1 is a regular interior vertex. The vertices v2 and v4-v6 are regular boundary vertices and respectively satisfy Eq. (1). Specifically, the vertex v2 has two incident faces and 3 incident edges; the vertex v4 has two incident faces and 3 incident edges; the vertex v5 has two incident faces and 3 incident edges; and the vertex v6 has two incident faces and 3 incident edges. Thus, the UV chart associated with the mesh depicted in FIG. 7A is a regular UV chart. In contrast, the vertex v3 of the mesh depicted in FIG. 7B is a boundary vertex and has two incident faces and four incident edges. Thus, the vertex v3 does not satisfy Eq. (1) and it is a singular vertex; while the vertices v7-v10 are regular boundary vertices and respectively satisfy Eq. (1). As such, the 2D UV charts associated with the meshes depicted in FIGS. 7B and 7C are irregular UV charts (the mesh depicted in FIG. 7C has an interior boundary loop). In other words, a UV chart is irregular if the UV chart is at least one of non-manifold and non-simply connected. The mesh frame is determined to be associated with an irregular UV chart when the mesh frame has at least one non-manifold vertex. A vertex (e.g., v3 in FIG. 7B or v5 in FIG. 7C) in the mesh frame is non-manifold when the vertex has more than two incident boundary edges.

At operation S830, the encoder 301 performs boundary detection to the UV chart to identify one or more boundary loops in the UV chart. In some embodiments, after determining that the UV chart is an irregular UV chart, the encoder 301 determines the Euler characteristic of the UV chart and then identifies the one or more boundary loops in the UV chart based on the determined Euler characteristic of the UV chart. As noted above, the number of detected interior boundary loops in the non-manifold mesh matches the number of holes detected in the UV chart based on the Euler characteristic and Betti numbers. As shown in FIG. 7C, the Euler characteristic $\chi=11-22+11=0$, and the Betti numbers $b_0=1$, $b_2=0$, genus $g=0$, so the expected number of holes is $h=b_1-2g=b_0+b_2-\chi-2g=1$. Thus, according to the Euler characteristic and Betti numbers, there is one hole (interior boundary loop) in the mesh which matches the result from the boundary loop detection procedure for non-manifold meshes.

At operation S840, the encoder 301 compresses (e.g., encodes) information of the identified one or more boundary loops into the metadata 330 in the bitstream associated with the mesh frame along with the rest of the video codecs including the occupancy map 315, the geometry map 320, the attribute map 325, etc. In some embodiments, the encoder 301 signals a number of the identified one or more boundary loops and the UV coordinates and corresponding 3D coordinates of vertices of each of boundary map in the bitstream. In some embodiments, the encoder 301 encodes the information of the identified one or more boundary loops according to a predefined protocol so that the decoder 351 can decode the information of the identified one or more boundary loops from the bitstream and reconstruct the mesh frame accordingly.

Figure 9:
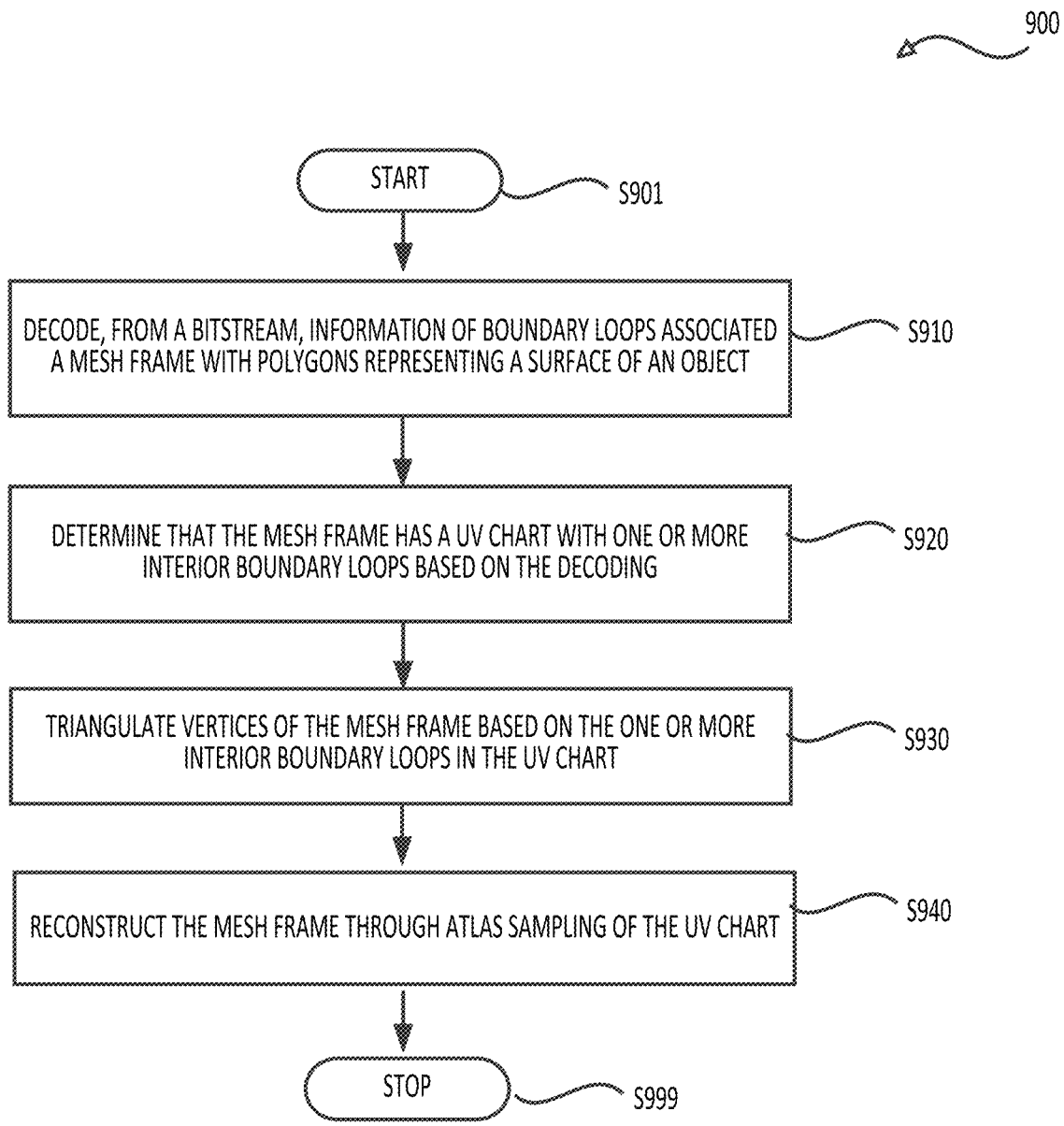
FIG. 9 is a flow diagram illustrating mesh reconstruction, in accordance with embodiments of the present disclosure.

FIG. 9 is a flow diagram illustrating mesh reconstruction, in accordance with embodiments of the present disclosure.

At operation S901, the decoder 351 starts the mesh reconstruction processor. At operation S910, the decoder 315 decodes, from a bitstream, information of boundary loops associated a mesh frame with polygons representing a surface of an object. In some embodiments, there is a predefined protocol between the encoder 301 and the decoder 351. According to the protocol, the encoder 301 encodes the information of the boundary loops associated the mesh frame into the bitstream and the decoder 351 decodes the information accordingly.

At operation S920, the decoder 351 determines that the mesh frame has a UV chart with one or more interior boundary loops based on the decoding of the information from the bitstream. As noted above, the UV chart is an irregular UV chart when the mesh frame has at least one interior boundary loop.

At operation S930, the decoder 351 triangulates vertices of the mesh frame based on the one or more interior boundary loops in the UV chart.

At operation S940, the decoder 351 reconstructs the mesh frame through the atlas sampling of the UV chart.

In some embodiments, the decoder 351 decodes the received occupancy map, attribute map, and geometry map may be decoded. As an example, the decoder 351 may decode the encoded occupancy maps 315, geometry maps 320, and attribute maps 325 to generate decoded occupancy maps 335, decoded geometry maps 340, and decoded attribute maps 345. A respective vertex associated with each occupied position in the decoded occupancy map may be recovered. As an example, the decoder 351 may recover respective vertices associated with each occupied position and/or pixel based on the decoded occupancy maps 335. The 3D geometry coordinates associated with each occupied position may be obtained based on the decoded occupancy map and decoded geometry map. As an example, the decoder 351 may obtain 3D geometry coordinates associated with each occupied position based on the decoded occupancy maps 335 and decoded geometry maps 340. The attribute values associated with each occupied position may be obtained based on the decoded occupancy map and decoded attribute map. As an example, the decoder 351 may obtain attribute values associated with each occupied position based on the decoded occupancy maps 335 and decoded attribute maps 345.

The connectivity information may be inferred based on the decoded maps or may be inferred from explicit signaling in the metadata. As an example, the decoder 351 may infer connectivity information based on the decoded occupancy maps 335, decoded geometry maps 340, decoded attribute maps 345, and metadata 350.

In some embodiments, the connectivity information associated with the input mesh and/or 2D UV atlas may be implicitly inferred from the occupancy status of neighboring points on decoded occupancy maps by certain rules (e.g., FIG. 5(1)-(5)). The orientation of the connectivity (clockwise or counterclockwise) may be parsed from high-level syntax, such as sequence header, slice header, etc., or fixed (assumed) by encoder and decoder. In some embodiments, the reconstructed mesh may be a hybrid type mesh, e.g., some regions in the mesh frame generate triangle meshes while other regions generate quad meshes. The connectivity type can be signaled in high-level syntax, such as sequence header, slice header.

In some embodiments, the connectivity information may also be reconstructed by explicit signaling. If a polygon cannot be recovered by implicit rules, the encoder may signal the connectivity information in the bitstream (e.g., as metadata). Any appropriate means to reduce the overhead of the explicit signaling, such as depending on the boundaries of polygons may be used.

Finally, a mesh may be reconstructed based on the decoded maps and connectivity information. As an example, the decoder 351 may generate reconstructed mesh 360 based on decoded occupancy maps 335, decoded geometry maps 340, decoded attribute maps 345, and metadata 350. The decoder 351 may use appropriate reconstruction filters and/or post-processing techniques to generate the reconstructed mesh 360. According to some embodiments, the reconstructed mesh may have different connectivity from the input mesh. As an example, the input mesh may be a triangle mesh, while the reconstructed mesh may be a quad mesh.

The techniques, described above, can be implemented as computer software using computer-readable instructions and physically stored in one or more computer-readable media. For example, FIG. 10 shows a computer system 1000 suitable for implementing certain embodiments of the disclosure.

The computer software can be coded using any suitable machine code or computer language, that may be subject to assembly, compilation, linking, or like mechanisms to create code including instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 10:
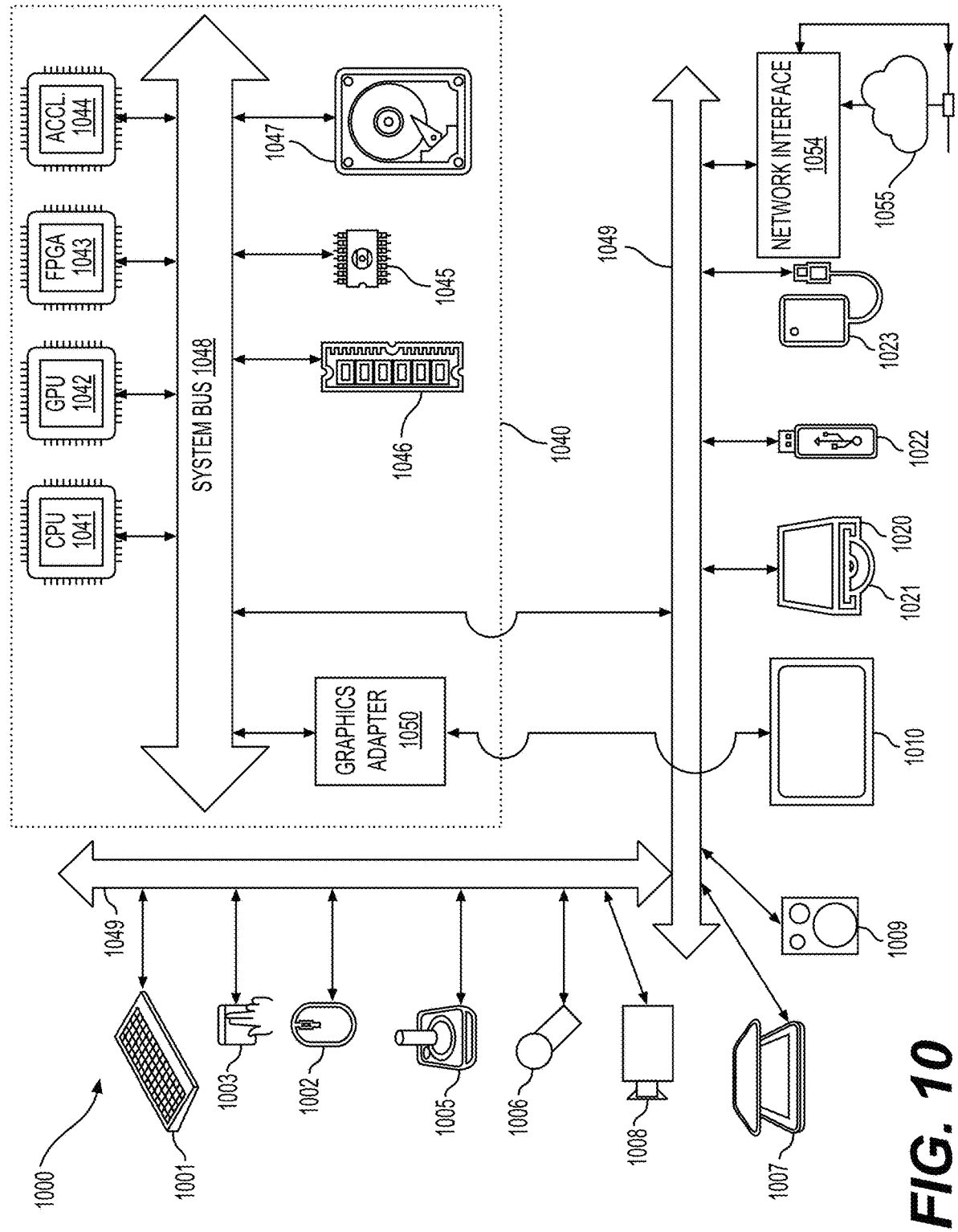
FIG. 10 is a block diagram of a computer system suitable for implementing embodiments of the present disclosure.

The components shown in FIG. 10 for computer system 1000 are examples and are not intended to suggest any limitation as to the scope of use or functionality of the computer software implementing embodiments of the present disclosure. Neither should the configuration of components be interpreted as having any dependency or requirement relating to any one or combination of components illustrated in the non-limiting embodiment of a computer system 1000.

Computer system 1000 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 1001, mouse 1002, trackpad 1003, touch screen 1010, data-glove, joystick 1005, microphone 1006, scanner 1007, camera 1008.

Computer system 1000 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 1010, data glove, or joystick 1005, but there can also be tactile feedback devices that do not serve as input devices). For example, such devices may be audio output devices (such as: speakers 1009, headphones (not depicted)), visual output devices (such as screens 1010 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 1000 can also include human accessible storage devices and their associated media such as optical media including CD/DVD ROM/RW 1020 with CD/DVD or the like media 1021, thumb-drive 1022, removable hard drive or solid state drive 1023, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 1000 can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses 1049 (such as, for example USB ports of the computer system 1000; others are commonly integrated into the core of the computer system 1000 by attachment to a system bus as described below (for example Ethernet interface into a PC computer system or cellular network interface into a smartphone computer system). Using any of these networks, computer system 1000 can communicate with other entities. Such communication can be uni-directional, receive only (for example, broadcast TV), uni-directional send-only (for example CANbus to certain CANbus devices), or bi-directional, for example to other computer systems using local or wide area digital networks. Such communication can include communication to a cloud computing environment 1055. Certain protocols and protocol stacks can be used on each of those networks and network interfaces as described above.

Aforementioned human interface devices, human-accessible storage devices, and network interfaces 1054 can be attached to a core 1040 of the computer system 1000.

The core 1040 can include one or more Central Processing Units (CPU) 1041, Graphics Processing Units (GPU) 1042, specialized programmable processing units in the form of Field Programmable Gate Areas (FPGA) 1043, hardware accelerators for certain tasks 1044, and so forth. These devices, along with Read-only memory (ROM) 1045, Random-access memory 1046, internal mass storage such as internal non-user accessible hard drives, SSDs, and the like 1047, may be connected through a system bus 1048. In some computer systems, the system bus 1048 can be accessible in the form of one or more physical plugs to enable extensions by additional CPUs, GPU, and the like. The peripheral devices can be attached either directly to the core's system bus 1048, or through a peripheral bus 1049. Architectures for a peripheral bus include PCI, USB, and the like. A graphics adapter 1050 may be included in the core 1040.

CPUs 1041, GPUs 1042, FPGAs 1043, and accelerators 1044 can execute certain instructions that, in combination, can make up the aforementioned computer code. That computer code can be stored in ROM 1045 or RAM 1046. Transitional data can be also be stored in RAM 1046, whereas permanent data can be stored for example, in the internal mass storage 1047. Fast storage and retrieve to any of the memory devices can be enabled through the use of cache memory, that can be closely associated with one or more CPU 1041, GPU 1042, mass storage 1047, ROM 1045, RAM 1046, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 1000, and specifically the core 1040 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 1040 that are of non-transitory nature, such as core-internal mass storage 1047 or ROM 1045. The software implementing various embodiments of the present disclosure can be stored in such devices and executed by core 1040. A non-transitory computer-readable medium can include one or more memory devices or chips, according to particular needs. The software can cause the core 1040 and specifically the processors therein (including CPU, GPU, FPGA, and the like) to execute particular processes or particular parts of particular processes described herein, including defining data structures stored in RAM 1046 and modifying such data structures according to the processes defined by the software. In addition or as an alternative, the computer system can provide functionality as a result of logic hardwired or otherwise embodied in a circuit (for example: accelerator 1044), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several non-limiting embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for atlas sampling-based dynamic mesh compression performed by at least one processor, the method comprising:
   receiving a mesh frame with polygons representing a surface of an object;
   determining that the mesh frame is associated with an irregular UV chart based on one or more singularity components in the mesh frame;
   performing boundary detection to the UV chart to identify one or more boundary loops in the UV chart, the boundary detection comprising:
   determining a Euler characteristic of the UV chart; and
   identifying the one or more boundary loops in the UV chart based on the Euler characteristic of the UV chart; and
   compressing information of the identified one or more boundary loops into a bitstream.

2. The method according to claim 1, wherein a UV chart is irregular if the UV chart is at least one of non-manifold and non-simply connected.

3. The method according to claim 1, wherein the mesh frame is divided into one or more regions, each of the one or more regions has a respective sampling rate for the region.

4. The method according to claim 3, wherein the sampling rates for the one or more regions are signaled in a high-level syntax in the bitstream.

5. The method according to claim 1, wherein the mesh frame is determined to be associated with an irregular UV chart when the mesh frame has at least one non-manifold vertex.

6. The method according to claim 5, wherein a vertex in the mesh frame is non-manifold when the vertex has more than two incident boundary edges.

7. The method according to claim 1, wherein the compressing information of the identified one or more boundary loops into a bitstream further comprises:
  signaling a number of the identified one or more boundary loops in the bitstream; and
  signaling UV coordinates and corresponding 3D coordinates of vertices of each of boundary map in the bitstream.

8. A computing device, comprising:
  at least one memory configured to store program code; and
  at least one processor configured to execute the program code to perform a method for atlas sampling-based dynamic mesh compression, the method including:
    receiving a mesh frame with polygons representing a surface of an object;
    determining that the mesh frame is associated with an irregular UV chart based on one or more singularity components in the mesh frame;
    performing boundary detection to the UV chart to identify one or more boundary loops in the UV chart, the boundary detection comprising:
      determining a Euler characteristic of the UV chart; and
      identifying the one or more boundary loops in the UV chart based on the Euler characteristic of the UV chart; and
    compressing information of the identified one or more boundary loops into a bitstream.

9. The computing device according to claim 8, wherein a UV chart is irregular if the UV chart is at least one of non-manifold and non-simply connected.

10. The computing device according to claim 8, wherein the mesh frame is divided into one or more regions, each of the one or more regions has a respective sampling rate for the region.

11. The computing device according to claim 10, wherein the sampling rates for the one or more regions are signaled in a high-level syntax in the bitstream.

12. The computing device according to claim 8, wherein the mesh frame is determined to be associated with an irregular UV chart when the mesh frame has at least one non-manifold vertex.

13. The computing device according to claim 12, wherein a vertex in the mesh frame is non-manifold when the vertex has more than two incident boundary edges.

14. The computing device according to claim 8, wherein the compressing information of the identified one or more boundary loops into a bitstream further comprises:
  signaling a number of the identified one or more boundary loops in the bitstream; and
  signaling UV coordinates and corresponding 3D coordinates of vertices of each of boundary map in the bitstream.

15. A non-transitory computer-readable medium storing instructions that, when executed by one or more processors of a computing device, cause the computing device to perform a method for atlas sampling-based dynamic mesh compression, the method including:
  receiving a mesh frame with polygons representing a surface of an object;
  determining that the mesh frame is associated with an irregular UV chart based on one or more singularity components in the mesh frame;
  performing boundary detection to the UV chart to identify one or more boundary loops in the UV chart, the boundary detection comprising:
    determining a Euler characteristic of the UV chart; and
    identifying the one or more boundary loops in the UV chart based on the Euler characteristic of the UV chart; and
  compressing information of the identified one or more boundary loops into a bitstream.

16. The non-transitory computer-readable medium according to claim 15, wherein a UV chart is irregular if the UV chart is at least one of non-manifold and non-simply connected.

17. The non-transitory computer-readable medium according to claim 15, wherein the mesh frame is determined to be associated with an irregular UV chart when the mesh frame has at least one non-manifold vertex.

18. The non-transitory computer-readable medium according to claim 15, wherein the compressing information of the identified one or more boundary loops into a bitstream further comprises:
  signaling a number of the identified one or more boundary loops in the bitstream; and
  signaling UV coordinates and corresponding 3D coordinates of vertices of each of boundary map in the bitstream.

19. The non-transitory computer-readable medium according to claim 15, wherein the mesh frame is divided into one or more regions, each of the one or more regions has a respective sampling rate for the region.

20. The non-transitory computer-readable medium according to claim 19, wherein the sampling rates for the one or more regions are signaled in a high-level syntax in the bitstream.

* * * * *